US010671991B2

(12) United States Patent
Fernandes et al.

(10) Patent No.: US 10,671,991 B2
(45) Date of Patent: Jun. 2, 2020

(54) SELF-AUTHENTICATING PEER TO PEER TRANSACTION

(71) Applicant: Quisk, Inc., Sunnyvale, CA (US)

(72) Inventors: Jorge M. Fernandes, Danville, CA (US); Ziad Alshobaki, Dubai (AE)

(73) Assignee: Quisk, Inc., Sunnyvale, CA (US)

( * ) Notice: Subject to any disclaimer, the term of this patent is extended or adjusted under 35 U.S.C. 154(b) by 226 days.

(21) Appl. No.: 15/597,641

(22) Filed: May 17, 2017

(65) Prior Publication Data

US 2017/0249621 A1    Aug. 31, 2017

Related U.S. Application Data

(63) Continuation of application No. 14/941,382, filed on Nov. 13, 2015, now Pat. No. 9,818,099, which is a continuation of application No. 14/623,418, filed on Feb. 16, 2015, now Pat. No. 9,189,784, which is a continuation of application No. 13/755,421, filed on Jan. 31, 2013, now Pat. No. 8,959,032.

(60) Provisional application No. 61/711,957.

(51) Int. Cl.
*G06Q 20/02* (2012.01)
*G06Q 20/22* (2012.01)
*G06Q 20/32* (2012.01)
*G06Q 20/40* (2012.01)
*G06Q 20/42* (2012.01)

(52) U.S. Cl.
CPC ......... *G06Q 20/223* (2013.01); *G06Q 20/02* (2013.01); *G06Q 20/32* (2013.01); *G06Q 20/322* (2013.01); *G06Q 20/3223* (2013.01); *G06Q 20/3227* (2013.01); *G06Q 20/40* (2013.01); *G06Q 20/401* (2013.01); *G06Q 20/42* (2013.01)

(58) Field of Classification Search
CPC ....... G06Q 20/00; G06Q 20/223; G06Q 20/02
USPC ......................................................... 705/44
See application file for complete search history.

(56) References Cited

U.S. PATENT DOCUMENTS

| | | |
|---|---|---|
| 6,934,372 B1 | 8/2005 | Lynam et al. |
| 7,080,049 B2 | 7/2006 | Truitt et al. |
| 7,216,803 B2 | 5/2007 | Nwosu |
| 7,290,704 B1 | 11/2007 | Ball et al. |

(Continued)

FOREIGN PATENT DOCUMENTS

| | | |
|---|---|---|
| CN | 1753020 A | 3/2006 |
| CN | 101034451 A | 9/2007 |

(Continued)

OTHER PUBLICATIONS

Notice of Allowance dated Jul. 10, 2017 for U.S. Appl. No. 14/941,382.

(Continued)

*Primary Examiner* — Robert R Niquette
*Assistant Examiner* — Liz P Nguyen
(74) *Attorney, Agent, or Firm* — MLO, a professional corp.

(57) ABSTRACT

A system and method of transaction processing is provided. The system includes a central server, which, after receiving transaction and recipient information from an initiator, sends a verification code to the initiator. The server also sends instructions for the initiator to send the code to a recipient via an outside communication channel. The server receives the verification code from the recipient, and verifies the transaction. In this manner, security may be maintained.

15 Claims, 7 Drawing Sheets

(56) References Cited

U.S. PATENT DOCUMENTS

| | | | |
|---|---|---|---|
| 7,527,194 | B2 | 5/2009 | Truitt et al. |
| 7,716,129 | B1 | 5/2010 | Tan et al. |
| 7,848,500 | B2 | 12/2010 | Lynam et al. |
| 7,848,504 | B2 | 12/2010 | Lynam et al. |
| 8,379,815 | B2 | 2/2013 | Lynam et al. |
| 8,572,391 | B2 | 10/2013 | Golan et al. |
| 8,959,032 | B2 | 2/2015 | Fernandes et al. |
| 9,189,784 | B2 | 11/2015 | Fernandes et al. |
| 9,519,902 | B2 | 12/2016 | Amancherla et al. |
| 2001/0042021 | A1 | 11/2001 | Matsuo et al. |
| 2002/0095389 | A1 | 7/2002 | Gaines |
| 2003/0018567 | A1 | 1/2003 | Flitcroft et al. |
| 2003/0225612 | A1 | 12/2003 | DeSimone et al. |
| 2004/0153421 | A1 | 8/2004 | Robinson |
| 2004/0199469 | A1 | 10/2004 | Barillova et al. |
| 2006/0200427 | A1 | 9/2006 | Morrison et al. |
| 2006/0287940 | A1* | 12/2006 | Almstrom ............... G06F 9/50 705/37 |
| 2007/0265984 | A1 | 11/2007 | Santhana |
| 2008/0010687 | A1 | 1/2008 | Gonen et al. |
| 2008/0011823 | A1 | 1/2008 | Patel et al. |
| 2008/0109279 | A1* | 5/2008 | Csoka ............... G06Q 20/10 705/35 |
| 2008/0147481 | A1 | 6/2008 | Robinson et al. |
| 2008/0162318 | A1 | 7/2008 | Butler et al. |
| 2008/0319801 | A1 | 12/2008 | Wilson |
| 2009/0024533 | A1 | 1/2009 | Fernandes et al. |
| 2009/0061831 | A1 | 3/2009 | Shastry |
| 2009/0070257 | A1 | 3/2009 | Csoka |
| 2009/0094163 | A1 | 4/2009 | Shastry |
| 2009/0171795 | A1 | 7/2009 | Clouthier et al. |
| 2009/0192935 | A1 | 7/2009 | Griffin et al. |
| 2010/0063895 | A1 | 3/2010 | Dominguez et al. |
| 2010/0082481 | A1 | 4/2010 | Lin et al. |
| 2010/0325694 | A1 | 12/2010 | Bhagavatula et al. |
| 2011/0055077 | A1 | 3/2011 | French et al. |
| 2011/0145152 | A1 | 6/2011 | Mccown |
| 2011/0149955 | A1 | 6/2011 | Petillo et al. |
| 2011/0184838 | A1 | 7/2011 | Winters et al. |
| 2011/0238564 | A1 | 9/2011 | Lim et al. |
| 2011/0270750 | A1 | 11/2011 | Abrams, Jr. et al. |
| 2011/0276418 | A1 | 11/2011 | Velani |
| 2011/0276486 | A1 | 11/2011 | Kuba |
| 2012/0066758 | A1 | 3/2012 | Kasturi |
| 2012/0078792 | A1 | 3/2012 | Bacastow et al. |
| 2012/0209733 | A1 | 8/2012 | Pelegero et al. |
| 2012/0254031 | A1 | 10/2012 | Walker et al. |
| 2012/0290421 | A1 | 11/2012 | Qawami et al. |
| 2014/0101049 | A1 | 4/2014 | Fernandes et al. |
| 2014/0258123 | A1 | 9/2014 | Fernandes |
| 2015/0161582 | A1 | 6/2015 | Fernandes et al. |
| 2016/0071084 | A1 | 3/2016 | Fernandes et al. |

FOREIGN PATENT DOCUMENTS

| | | |
|---|---|---|
| DE | 10310527 A1 | 9/2004 |
| EP | 1180756 A1 | 2/2002 |
| EP | 1868131 A1 | 12/2007 |
| FR | 2919742 A1 | 2/2009 |
| JP | 2006260504 A | 9/2006 |
| KR | 20050063176 A | 6/2005 |
| KR | 20060096593 A | 9/2006 |
| KR | 100885980 B1 | 3/2009 |
| WO | 9842173 A2 | 10/1998 |
| WO | 2006113834 A2 | 10/2006 |
| WO | 2007024148 A1 | 3/2007 |
| WO | 2008030397 | 3/2008 |
| WO | 2008030397 A2 | 3/2008 |
| WO | 2012073014 A1 | 6/2012 |

OTHER PUBLICATIONS

Office Action dated Jul. 10, 2017 for Chinese Patent Application No. 201380053094.2.
Office Action dated Oct. 3, 2017 for U.S. Appl. No. 15/376,478.
Examination Report dated Aug. 12, 2016 from the GCC Patent Office for Application No. GC 2013-24261.
Extended European Search Report dated Jan. 17, 2014 for European Patent Application No. 13166070.60.
International Search Report and Written Opinion dated Jan. 20, 2014 for PCT Application No. PCT/US2013/063992.
International Search Report and Written Opinion dated Jul. 10, 2013 for PCT Application No. PCT/US2013/034511.
International Search Report and Written Opinion dated May 20, 2014 for PCT Application No. PCT/US2014/016161.
International Search Report and Written Opinion dated May 28, 2014 for PCT Patent Application PCT/US2014/016160.
Notice of Allowance dated Dec. 22, 2014 for U.S. Appl. No. 13/755,421.
Notice of Allowance dated Jul. 17, 2015 for U.S. Appl. No. 14/623,418.
Office Action dated Apr. 6, 2017 for U.S. Appl. No. 14/941,382.
Office Action dated Dec. 1, 2014 for U.S. Appl. No. 14/031,381.
Office Action dated Dec. 26, 2014 for U.S. Appl. No. 13/957,246.
Office Action dated Dec. 27, 2013 for U.S. Appl. No. 13/755,421.
Office Action dated Dec. 5, 2013 for U.S. Appl. No. 13/957,246.
Office Action dated Feb. 6, 2014 for U.S. Appl. No. 13/786,408.
Office Action dated Jan. 15, 2014 for U.S. Appl. No. 14/031,381.
Office Action dated Jul. 17, 2013 for U.S. Appl. No. 13/755,421.
Office Action dated Jul. 3, 2014 for U.S. Appl. No. 13/957,246.
Office Action dated Jul. 7, 2014 for U.S. Appl. No. 14/031,381.
Office action dated Mar. 14, 2017 for Mexican Patent Application No. MX/a/2015/009590.
Office Action dated Mar. 20, 2017 for U.S. Appl. No. 15/376,478.
Office Action dated May 19, 2016 for U.S. Appl. No. 14/941,382.
Office Action dated May 28, 2015 for U.S. Appl. No. 13/786,408.
Office Action dated May 30, 2014 for U.S. Appl. No. 13/786,408.
Office Action dated Nov. 20, 2014 for European Patent Application No. 13166070.6.
Office Action dated Oct. 6, 2014 for U.S. Appl. No. 13/786,408.
Office Action dated Sep. 3, 2014 for U.S. Appl. No. 13/755,421.
Office Action dated Sep. 9, 2016 for Mexico Patent Application No. MX/a/2015/004493.
Office Action dated Sep. 10, 2018 for U.S. Appl. No. 15/376,478.
Office Action dated Jan. 14, 2020 for Brazilian Patent application No. BR112015007912-1.

\* cited by examiner

SELF-AUTHENTICATING PEER TO PEER TRANSACTION

CROSS REFERENCE TO RELATED APPLICATIONS

This application is a continuation of U.S. patent application Ser. No. 14/941,382, filed Nov. 13, 2015 and entitled "Self-Authenticating Peer To Peer Transaction," which is a continuation of U.S. patent application Ser. No. 14/623,418 filed Feb. 16, 2015 and entitled "Self-Authenticating Peer To Peer Transaction," which issued as U.S. Pat. No. 9,189,784 on Nov. 17, 2015, which is a continuation of U.S. patent application Ser. No. 13/755,421 filed Jan. 31, 2013, entitled "Self-Authenticating Peer To Peer Transaction," which issued as U.S. Pat. No. 8,959,032 on Feb. 17, 2015, which claims priority benefit to U.S. Provisional Application No. 61/711,957, entitled "System and Method of Peer to Peer Verification" filed Oct. 10, 2012, all of which are incorporated by reference in their entirety herein.

BACKGROUND

The present disclosure relates to transaction processing, and in particular, to peer to peer verification of a transaction.

Unless otherwise indicated herein, the approaches described in this section are not prior art to the claims in this application and are not admitted to be prior art by inclusion in this section.

Traditionally, to send money electronically from one person to another, the sender, or initiator, would have to go to a bank or money transmitter, and provide proof of identity (typically a driver's license). The third party in this transaction—that is, the bank or money transmitter—provides the authentication, based on information obtained from the initiator and, possibly, the receiver. Also, either the initiator, or receiver, or both, may require a specialized account, which may limit the amount transferred, or the ways in which the transferred funds can be used.

SUMMARY

Embodiments of the present invention provide self-authentication for peer-to-peer transaction processing. One embodiment includes a computer-implemented method for such a peer-to-peer transaction. A server device receives transaction information and recipient information from an initiator's mobile device. The recipient information identifies a recipient. An initiator account is identified from caller identification information associated with the initiator's mobile device. Optionally, the server device authenticates the initiator using authentication information sent by the initiator. The server device sends a first validation code to the initiator mobile device, along with instructions for sending the first validation code to the recipient. The server receives the first validation code from the recipient via a private communications channel. The server validates the first validation code and processes the transaction.

According to a further optional embodiment, the server device receives the transaction information and recipient information from an initiator banking provider. The server device sends a first validation code to the initiator mobile device, along with instructions for sending the first validation code to the recipient. The server receives the first validation code from the recipient via a private communications channel, and, after validating the validation code, the server device instructs the initiator and recipient banking provider to process the transaction.

Another embodiment of the present invention includes a machine-readable medium including instructions executable by the machine. These instructions cause the machine to accept receipt of transaction information and recipient information from an initiator's mobile device. The machine is instructed to identify initiator account information from caller identification information. Optionally, the machine is instructed to send a prompt for verification information to the recipient; the machine is then instructed to receive this verification information and use it to verify the initiator. The machine is instructed to send a first validation code to the initiator's mobile device, along with instructions for sending the first validation code to the recipient. The machine is instructed to accept receipt of the first validation code from the recipient via a private communications channel. The machine is instructed to validate the first validation code and, upon successful validation, processes the transaction.

DETAILED DESCRIPTION

Figure 1:
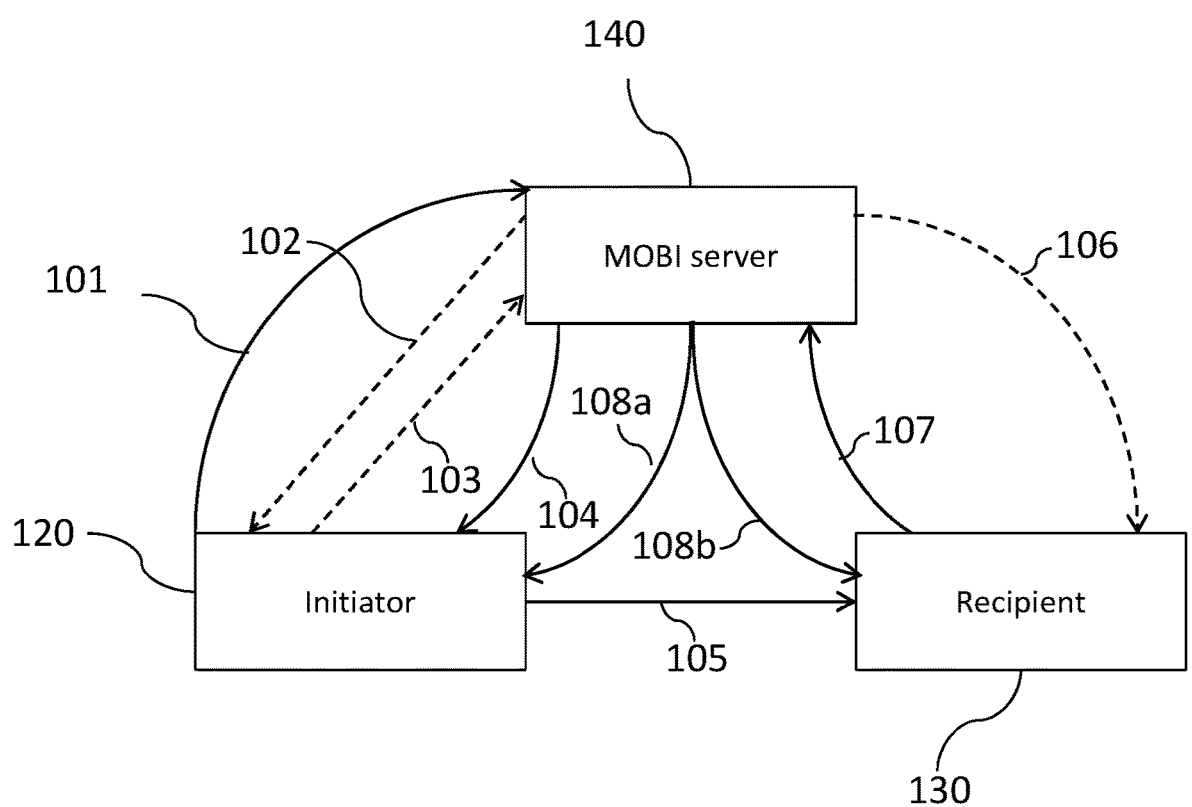
FIG. 1 is a block diagram of a peer-to-peer transaction system according to an embodiment of the present invention.

Described herein are techniques for improvements in transaction processing. In particular, the transaction process is automated while still maintaining security. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

The following description relates to a transaction verification process referred to as "MOBIverify", the "MOBIbucks Payment Solution", or just the "transaction process". In general, MOBIverify is a multi-step transaction verification process for unattended, or self-authenticating, peer to peer money transmissions through the use of mobile phones. The process is "unattended", or "self-authenticating", in the sense of not requiring the physical presence of a third party that performs an authentication function; that is, only the MOBIbucks account holder (also known as the initiator), recipient, and the MOBIbucks server device are required to perform an authentication function.

As mentioned above, to send money from one person to another, the initiator goes to a bank or money transmitter, and provides proof of identity (typically a driver's license). The MOBIbucks Payment Solution allows customers the freedom to make remote peer to peer transactions without a card or a signature and still maintain the security of identity verification, allow for repudiation, and execute the transaction.

MOBIverify provides a multi-step verification process for unattended, or self-authenticating peer to peer (P2P) transactions utilizing the mobile phone or other mobile device. MOBI account holders may use their MOBI accounts to send money to other consumers from their phones, from within a participating bank's on-line service, at participating ATMs, or at selected merchant terminals. In general, a MOBI account is, or is a feature of, a regular bank account. The MOBI account may also be similar to that described in U.S. Patent Publication No. 2009/0024533 A1 for "Payment Systems and Methods" filed Aug. 29, 2007, which is incorporated herein in its entirety.

In the following descriptions, it is understood that all messages involved can be sent via a number of means; for example, wired or wireless voice or data channels, or the like. These means may be private or explicitly secure communication means; for example, encrypted voice or data channels, or the like. Communication means include (i) messages to and/or from a mobile device such as email messages, voice calls, data messages, text messages, messages send via apps (e.g., Facebook, Linked In, Skype and the like) and (ii) the same sort of messages sent to and/or from a stationary device such as a desk top computer or browser running on a television.

FIG. 1 shows an example of the MOBIverify process. The process of FIG. 1 shows a basic configuration where the initiator 120 and the recipient 130 have the same banking provider, which implements the MOBI Central System 140 in a hosted implementation (the MOBI Central System is also referred to as the "server device"). To use their mobile phone to initiate a P2P transfer, the initiator 120 sends to the MOBI Central System 140 a text or data message 101 that includes an identifier for the recipient (e.g., the recipient's mobile phone number), the transaction amount, and optionally a MOBI P2P standard keyword. The message 101 may be sent via a communication route which may include wireless and wired communication channels. The P2P standard keyword may be an initiating transaction code, indicating to the system that it is to perform the P2P process. In other embodiments, the MOBI Central System may perform other functions that may be indicated by other keywords or transaction codes. The initiator may use a short code as the destination for the text or data message to designate the MOBI Central System.

As an example, a bank may implement access to its mobile banking services with the short code "67890", and may use the standard keyword "MOBI" to access the MOBIverify functionality in the mobile banking system. The initiator 120 may then send a text or data message to "67890" with the following information: "MOBI 415 888 9999 $100". This message instructs the MOBI Central System 140 to transfer $100 to the account associated with the mobile number 415-888-9999 of the recipient 130, as further detailed below.

In an alternative embodiment, a text or data message is sent identifying a recipient's routing and account information, including, for example, the SWIFT code for the recipient's account, for a direct wire transfer to the recipient's bank account. In this embodiment, the initiator 120 may send a text or data message to "67890" with the following information: "MOBI 123 456 789 12345 12345 $100". The text or data message may also include contact information for the recipient, for example, an e-mail address.

After the transfer is initiated by either of the above described processes, the MOBI Central System 140 identifies the initiator's account information from, for example, caller identification information, transmitted with the initiating text message, data message, phone call or the like. The initiator's account information may correspond to the initiator's mobile phone number. After identification of the initiator's account information, the MOBI Central System 140 then may optionally send a message 102, which may include a computer generated phone call, or a text or data message, or the like, to the mobile device of the initiator 120. When the initiator 120 answers his mobile phone or responds to the message, the initiator 120 is prompted to provide identity verification information 103. For example, the initiator 120 may be asked to enter a personal identification number (PIN) on the phone's keypad. This information 103 is sent the MOBI central system 140, which then uses the information to validate the initiator's mobile phone and authenticate the initiator 120 to the MOBI Central System 140. The MOBI Central System 140 may perform other validation checks at this time, such as available balances and preprogrammed transaction limits.

In an optional embodiment, when a recipient phone number is used, the MOBI Central System 140 checks to see if the recipient has a MOBI account by comparing the recipient's mobile phone number against the database of existing account holder identifiers (e.g., mobile phone numbers). If there is an existing MOBI account, the MOBI Central System 140 checks to see of pre-programmed transaction limits have been exceeded (and/or it may check other pre-programmed parameters). If the recipient is not an existing MOBI account holder, the MOBI Central System 140 may optionally create a MOBI account for the recipient that includes the recipient's mobile phone number, using the initiator's verification information 103 as temporary authentication for the receiver.

The actual funds are not transferred, however, until a second validation step is completed. Once the account holder's PIN is validated, the MOBI Central System 140 sends a second text, data or other type of message 104 containing a transaction specific validation code (the first validation code) to the mobile phone of the initiator 120, with instructions to forward the first validation code to the recipient 130. The initiator 120 can then forward a message 105 containing the first validation code to the recipient 130. This can be done using a number of methods, for example: forwarding the message 105 itself, sending an email, initiating a phone call, providing it verbally, or the like. The MOBI Central System 140 may also send a text, or other type of message 106 to the mobile phone number of the recipient 130 with a second validation code, along with instructions to send a reply text message containing both validation codes. The recipient 130 then sends a message 107 to the MOBI Central System 140 including the first verification code and the second verification code if used. If the MOBI Central System 140 created a new MOBI account for the recipient 130, the text or data message 107 may also include a temporary PIN for accessing the new MOBI account. The first validation code may be a pseudorandom code. The second validation code may be a pseudorandom code, or may be the transaction amount or some other identifier.

In an alternative embodiment, the recipient 130 may enter one or both of the validation codes via an internet browser so that a recipient mobile device is not required. For example, if a recipient's bank routing and account number are used, the initiator may email the recipient a validation code for entering into a MOBI account user interface via an internet browser. The browser may provide a secure user interface; for example, it may require the recipient to enter authentication information (for example, a user ID and password), and it may use a secure protocol for data transfer (for example, HTTPS). All messages and phone calls described may be replaced with communication via email, via such a secure user interface or via another secure communication means.

Once MOBI Central System 140 receives both validation codes, it processes the transfer from the initiator's MOBI account to the recipient's MOBI account. Once the transfer is complete, the MOBI Central System 140 sends to both the initiator 120 and recipient 130 a message alert 108*a*, 108*b* (text, data, email or the like) confirming the completion of the transaction.

If any of the requested messages are not received within a defined period from the initial transfer request (for example, between 12 and 48 hours, for example, 24 hours), or if any of the authentication steps is not verified, then the MOBI Central System 140 sends a message to the initiator 120 alerting him/her of the issue. In addition, the MOBI Central System 140 may roll back any actions it has performed such that a new initial message 101 is required for the transaction if such a time period as elapsed.

Once the recipient has received the confirmation (see 108*b*), the recipient can perform various actions, such as getting cash, paying a bill, or buying a product. These activities may be accomplished via the account access features of their bank account. These activities may include, for example, obtaining cash, making a purchase, or paying a bill.

Figure 2:
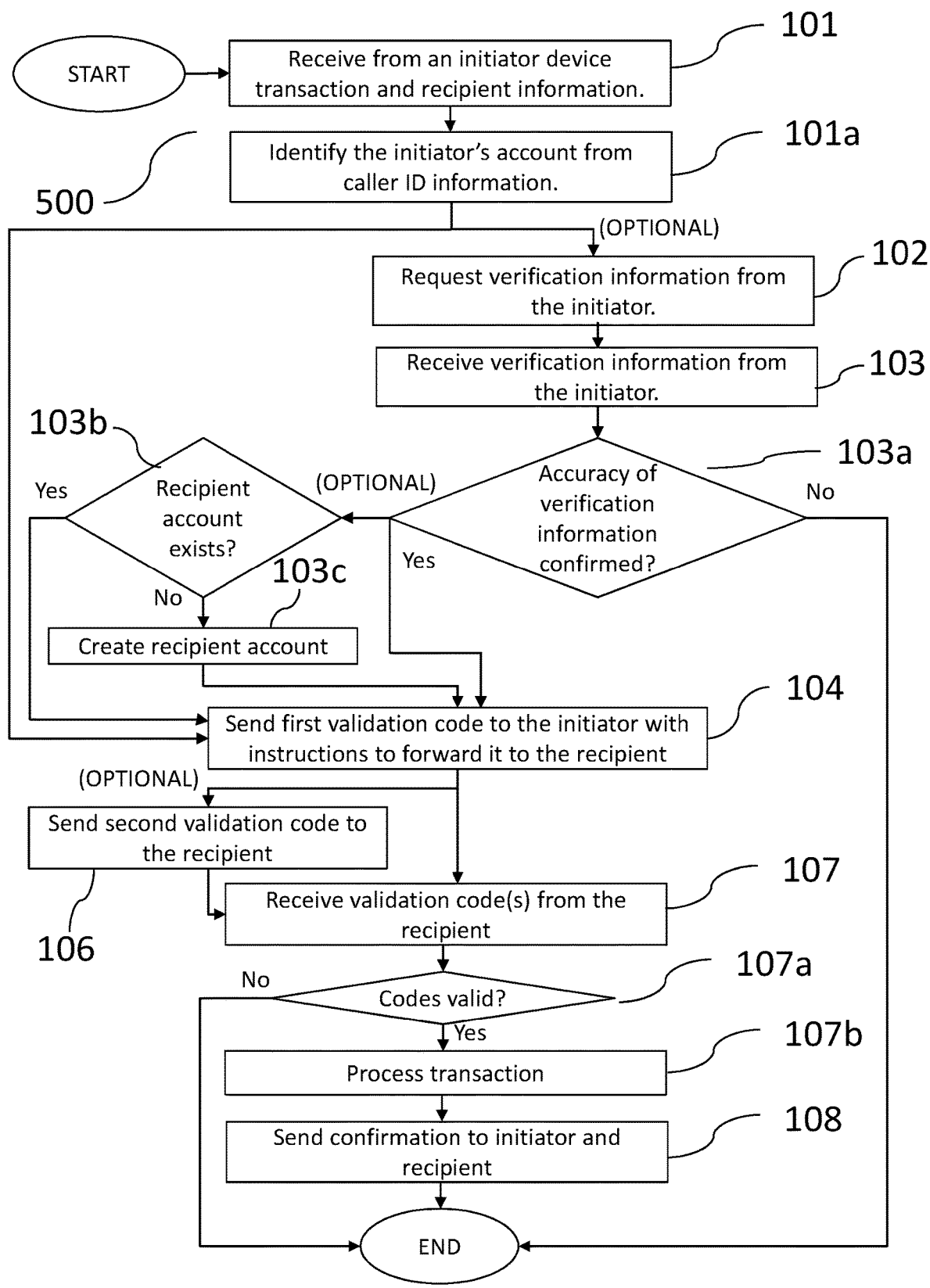
FIG. 2 is a flow chart describing a peer-to-peer transaction method according to an embodiment of the present invention.

FIG. 2 shows a flow chart 500, which describes the steps taken by the server in an embodiment of the current invention. In step 101, the server receives, from an initiator device, transaction and recipient information, which may include, for example, a transaction code, the transaction amount, and the recipient's mobile phone number. The server then uses caller identification information to identify the initiator's account (step 101*a*). Optionally, in step 102, the server requests verification information (for example, a PIN), from the initiator, and in step 103, the server receives the verification information from the initiator.

The initiator's verification information, if used, is checked in step 103*a*. If it is found accurate, the receiver's information may optionally be checked to see if the recipient has a MOBI account in step 103*b*. If the recipient does not have a MOBI account, one may be created for him/her in step 103*c*, using the initiator's verification information as temporary authorization. The server then sends a first validation code to the initiator in step 104. Also in step 104, the server sends instructions for forwarding the first validation code to the recipient. The sending of the first validation code and the sending of instructions may also take place in two separate steps. In an optional step 106, a second validation code is sent to the recipient by the server. The server receives the first validation code (and perhaps the second validation code if it's used) back from the recipient in step 107. If a new MOBI account was created for the recipient (in step 130*b*), step 107 may also include sending a temporary PIN for accessing the new MOBI account. The first validation code (and perhaps the second validation code) is checked for validity in step 107*a*, and, if valid, the transaction is processed in step 107*b*. Optionally, before the transaction is processed in step 107*b*, the server my initiate a delay period of, for example, 10 seconds to 10 minutes, for example, 30 seconds to 5 minutes. This delay period may allow for a number of contingencies, for example, it may allow for third-party verification, or it may be required by regulatory agencies. In step 108, the server sends confirmation of the transaction to the initiator and the recipient.

Other methods of verifying the identities of the initiator or recipient may be used. For example, in step 103 of FIG. 2, the server may receive a photo of the initiator. Alternatively, step 103 may comprise the receipt of a photo of the initiator's passport, or another identifying document, for example, a driver's license, or a utility bill. This photo may be taken with the initiator's mobile phone. These photos would then be compared to stored images of the sender or the sender's documents to verify the initiator's identity in step 103a. The comparison may be done manually or automatically with software. Similarly, the server may receive, in step 107, identification information from the remittance receiver, as well as the verification code(s). This information may consist of photos of the receiver, or of the receiver's identification documents, taken, for example, with the receiver's mobile phone camera. Step 107a would then include comparing the receiver's photos with images stored on the server.

Figure 3:
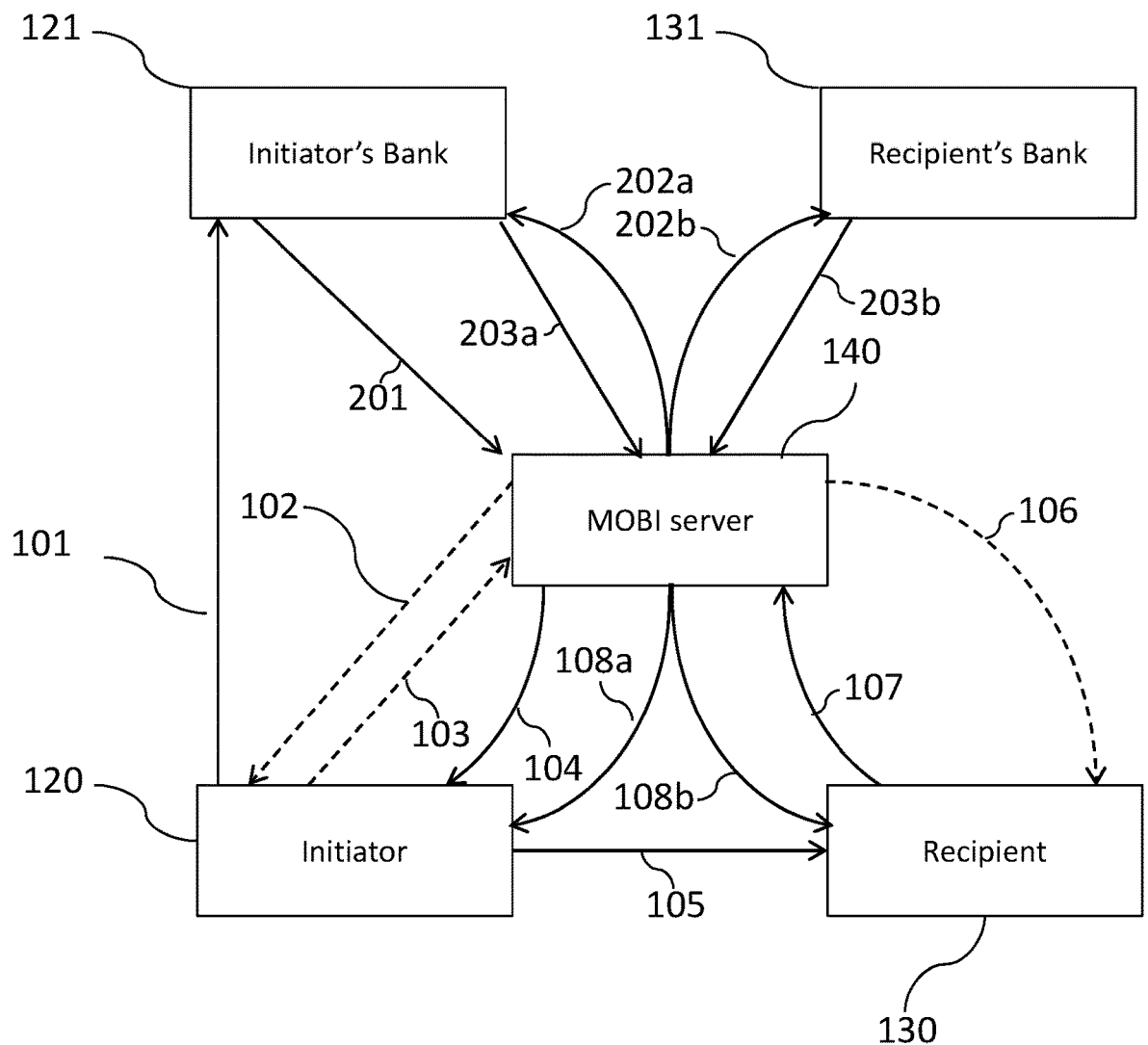
FIG. 3 is a block diagram of a peer-to-peer transaction system according to another embodiment of the present invention, in the case where communication takes place between separate banking institutions.

FIG. 3 is a diagram showing additional details for a case when the initiator and recipient do not have the same banking provider. The features are generally similar to those in FIG. 1.

One difference is that the initial message 101 goes from the initiator 120 to the initiator's bank 121. The initiator's bank 121 then contacts the MOBI Central System 140 with instructions 201 to perform the other steps: send the request 102 for the PIN (optional), send the message 104 with the first verification code, and optionally send the message 106 with the second verification code. As in the previous example, the initiator 120 communicates directly with the recipient 130 to send the message 105 with the first verification code, and the initiator 120 communicates with the MOBI Central System 140 to send the PIN 103, if necessary. Again, the recipient 130 sends a message 107 with the verification code(s) to the MOBI Central System 140.

Another difference is that after the MOBI Central System 140 has received the message 107 including the validation code(s), the MOBI Central System 140 sends instructions 202a, 202b to the initiator's bank 121 and to the recipient's bank 122 to implement the transaction. The MOBI Central System may optionally receive confirmation messages 203a, 203b from both banks before sending the confirmation messages 108a, 108b to the users.

Figure 4:
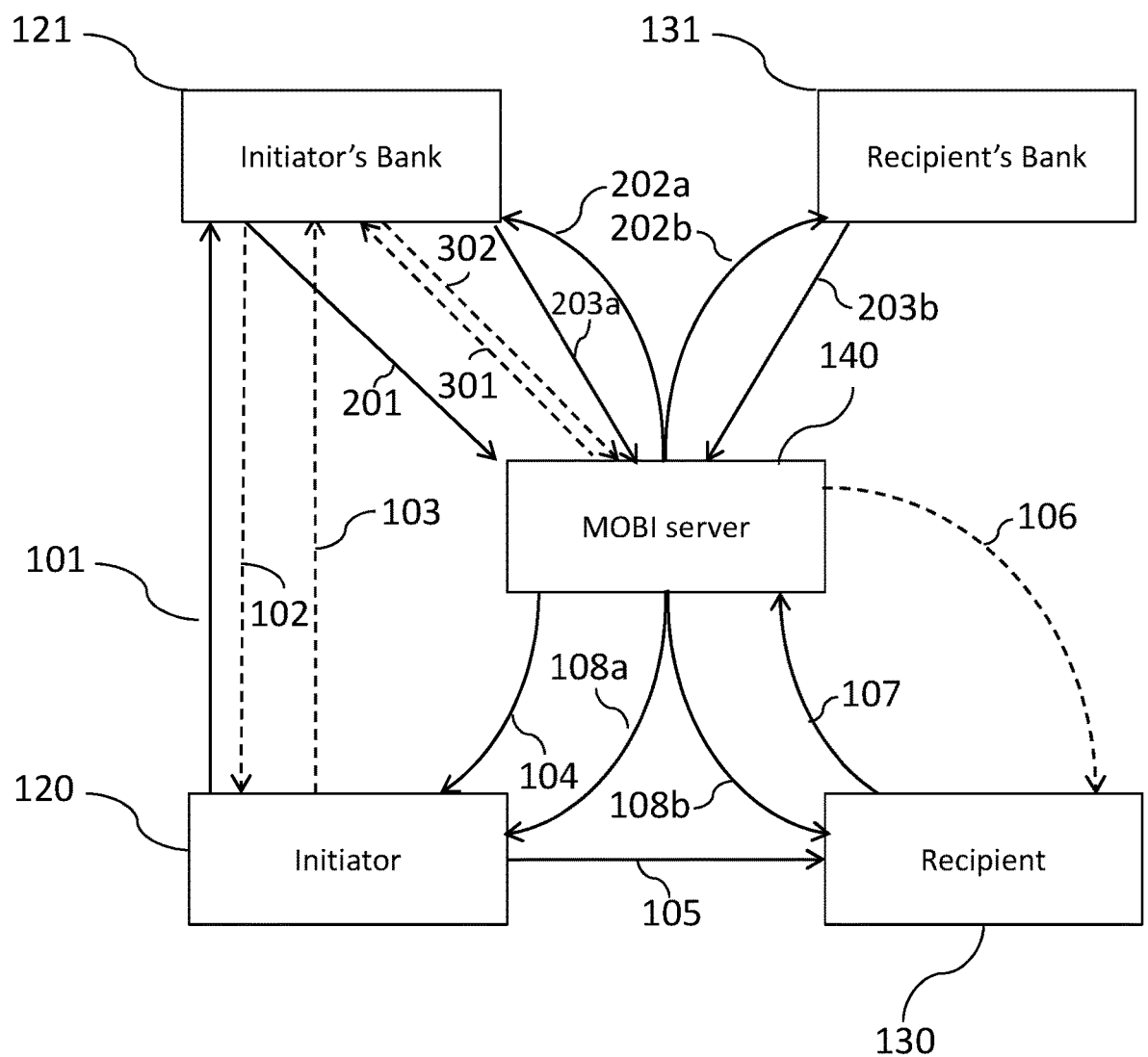
FIG. 4 is a block diagram of a peer-to-peer transaction system according to another embodiment, which provides a different distribution of process steps between the various banking institutions.

Depending upon the allocation of the various functions between the banks and the MOBI Central System, the originators and recipients of various messages may be varied from that shown in FIG. 3. For example, FIG. 4 shows that after the initiator's bank 121 receives the initial request 101, it then contacts the MOBI Central Server 140 with instructions 201 to send the initiator's authentication information 301 (for example, the initiator's PIN) to the initiator's bank 121. The initiator's bank 121 contacts the initiator 120 with a request 102 for the authentication information (for example, the PIN), and receives and verifies the authentication information 103. The initiator's bank 121 then sends confirmation 302 of the initiator's identity verification to the MOBI Central Server 140. The remainder of the transaction process may then operate as shown in FIG. 3.

Figure 5:
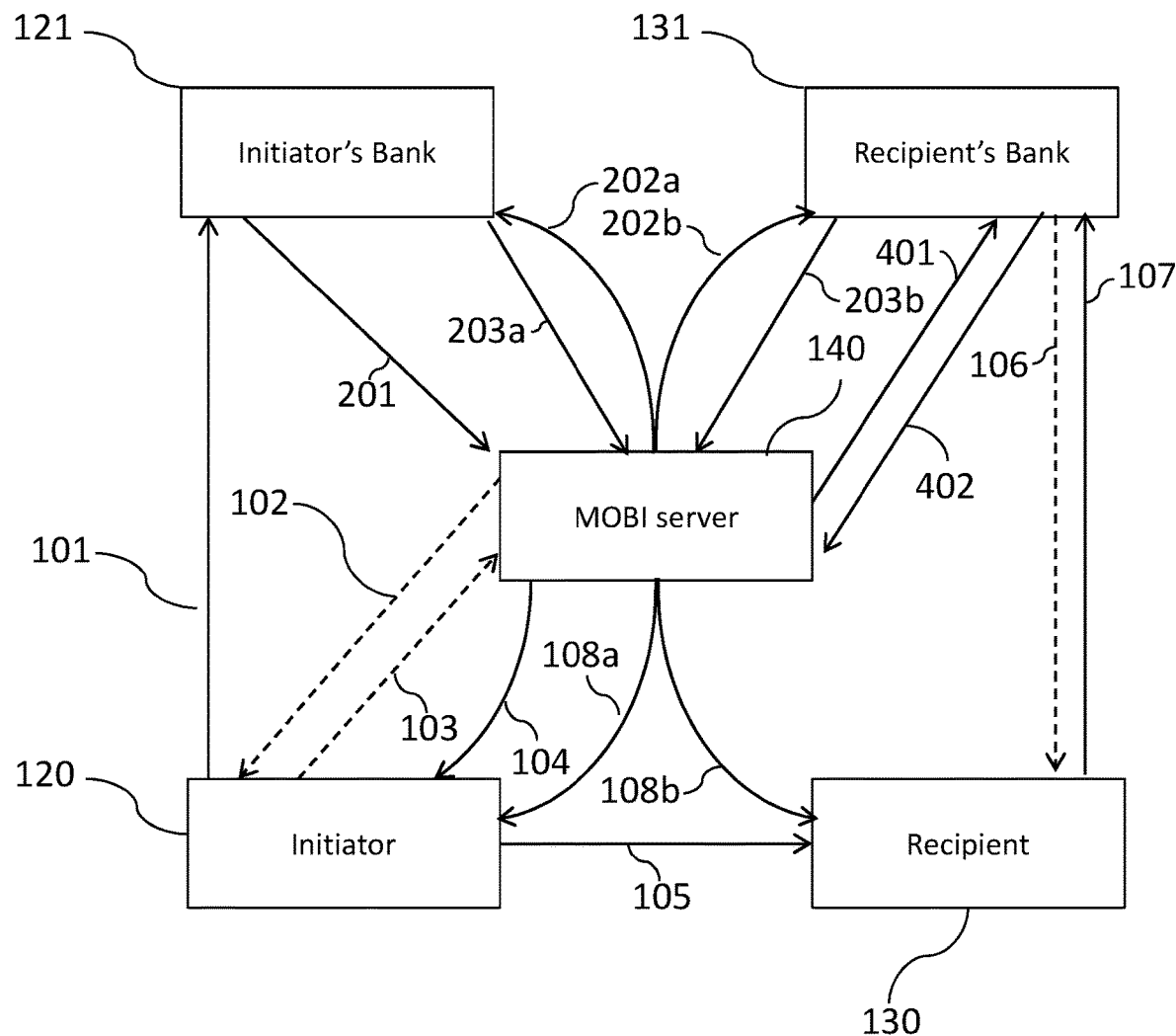
FIG. 5 is a block diagram of a peer-to-peer transaction system according to another embodiment, in which the recipient's banking institution manages certain steps in the process.

As another example, FIG. 5 shows how the recipient's bank 131 may manage the validation process. After the MOBI Central System 140 sends a message 104 with the first validation code to the initiator 120, the MOBI Central System 140 sends the recipient's bank 131 a message 401 with the first validation code. The recipient's bank 131 optionally generates the second validation code, and sends a message 106 containing this code to the recipient 130. The recipient 130 then sends a message 107 with the first verification code, and, if used, the second verification code, to the recipient's bank 131. The recipient's bank 131 then verifies the verification code(s). The recipient's bank 131 sends a message 402 with confirmation of the verification to the MOBI Central Server. The remainder of the transaction process may then operate as shown in FIG. 3.

Figure 6:
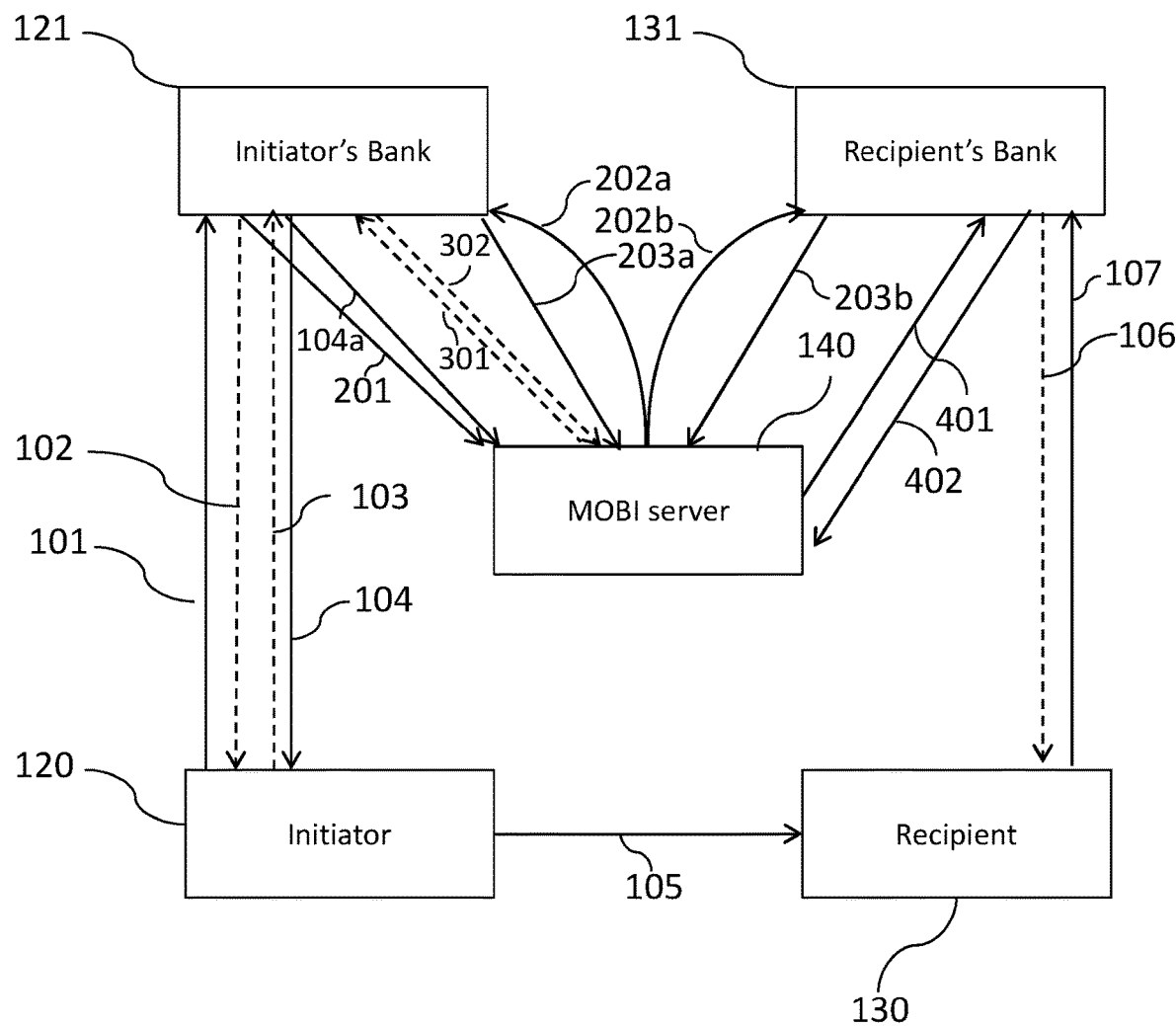
FIG. 6 is a block diagram of a peer-to-peer transaction system according to yet another embodiment, which provides a distribution of process steps wherein the sender and recipient communicate only with their banking providers.

In FIG. 6, an implementation of the MOBIverify system is shown where each customer only communicates with his or her bank, rather than the MOBI Central Server 140. This is essentially a combination of the implementations shown in FIG. 4 and FIG. 5. One difference is that the initiator's bank 121, rather than the MOBI Central Server 140, generates the first verification code. The initiator's bank then sends messages 104 and 104a containing the first verification code to the initiator 120 and the MOBI Central Server 140, respectively. The remainder of the verification procedure may then proceed as shown in FIG. 5.

Other additional features of the MOBIverify system may be implemented according to a "know your customer" protocol. One such additional feature is setting transfer limits based on authorization level. Various authorization levels may be defined based on the type of "know your customer" protocol performed. For example, one level of authorization may occur when the recipient provides both validation codes (as per 107 in FIG. 1). Another level of authorization may occur when the initiator, or the recipient, provides an image of an identification document (e.g., passport, license, utility bill, etc.) along with one of the messages sent to the MOBI Central Server; the MGM Central Server then compares this document with a stored copy of the document, or manages a review process performed by a human. Another level of authorization may occur when the system sends the second validation code to the recipient via U.S. Mail to the recipient's home address; the recipient may confirm receipt by sending the code via SMS from their mobile phone to the MOBI Central Server. Another level of authorization may occur when the recipient is an existing customer of the bank, but does not yet have their MOBI account set up. Another level of authorization may occur when one of the users has already provided some enhanced "know your customer" information to the MOBI Central Server, and provides a confirmation or identification of another user.

The various authorization levels may be associated with transaction amount or other account-specific limits. For example, when the validation occurs (as per 107 in FIG. 1) via text message from the recipient, the limit is $100. When the initiator provides an image of an identification document that is validated by the system, the limit is $300. When the recipient receives the Validation Code #2 via U.S. Mail at their home address, the limit is $1000. When the recipient is an existing customer of the bank, the limit is $1000.

Users may put cash into their accounts, or remove cash from their accounts, as follows.

Figure 7:
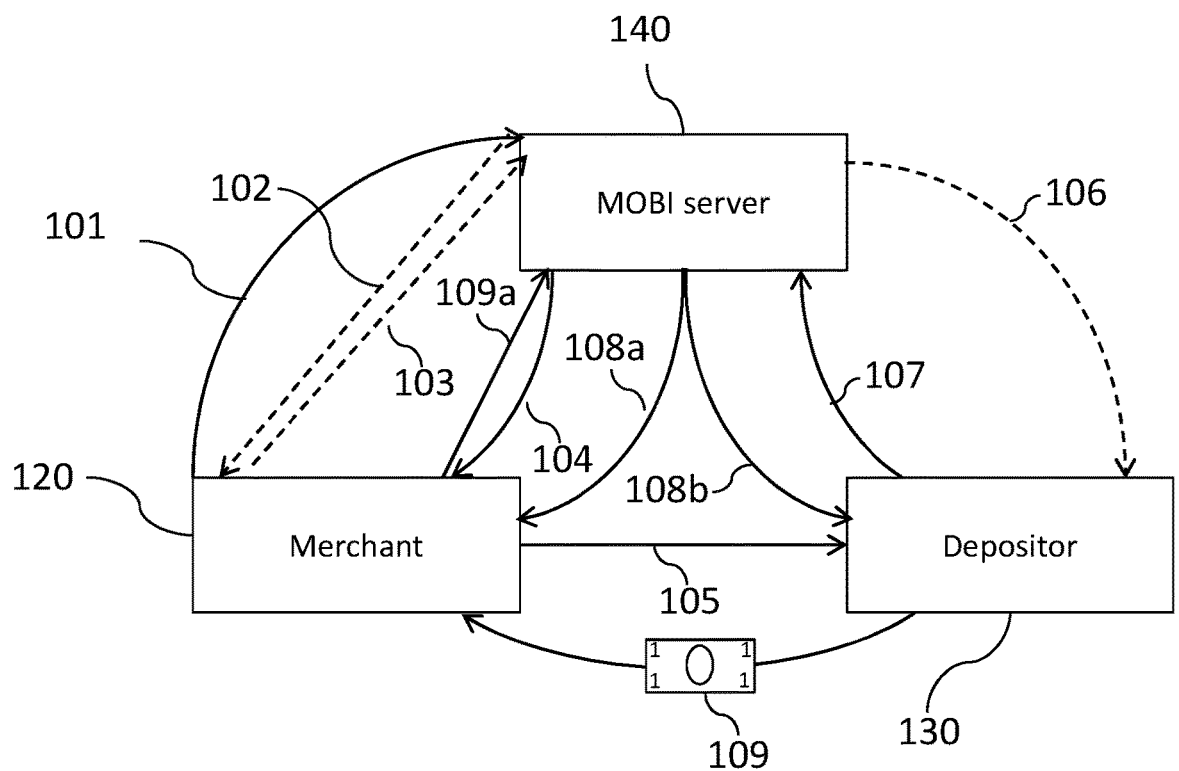
FIG. 7 is a block diagram of a peer-to-peer transaction system in which an initiator can deposit cash into an account, according to an embodiment of the present invention.

To deposit cash, a process like that shown in FIG. 7 may be used. A merchant with a cash register 120 takes the role of the initiator and the user who wants to deposit (the "depositor" 130) cash takes the role of the recipient. The process proceeds as described above, e.g. as per FIG. 1, with the merchant 120 (initiator) using the deposit amount as the transaction amount in the initiation message 101, and the MOBI Central Server 140 optionally verifying the merchant 120 with messages 102 and 103. A validation code message 104 is sent to the merchant 120, who gives this message 105 to the depositor 130. The depositor 120 may optionally receive a second validation code 106 from the MOBI Central Server 140. To complete the validation process, the depositor 130 then sends the validation code(s) 107 to the MOBI Central Server 140. At some point in the process, for example, at the start of the process, or after the the MOBI Central Server 140 sends the confirmation (108a and 108b) of the credit to the depositor's account, the depositor 130 (recipient) gives the cash 109 to the merchant 120 (initiator). The merchant 120 (initiator) sends a confirmation 109a to the MOBI Central Server 140, to record the cash transaction. The MOBI Central Server may send a final verification (not shown) to both parties.

Figure 8:
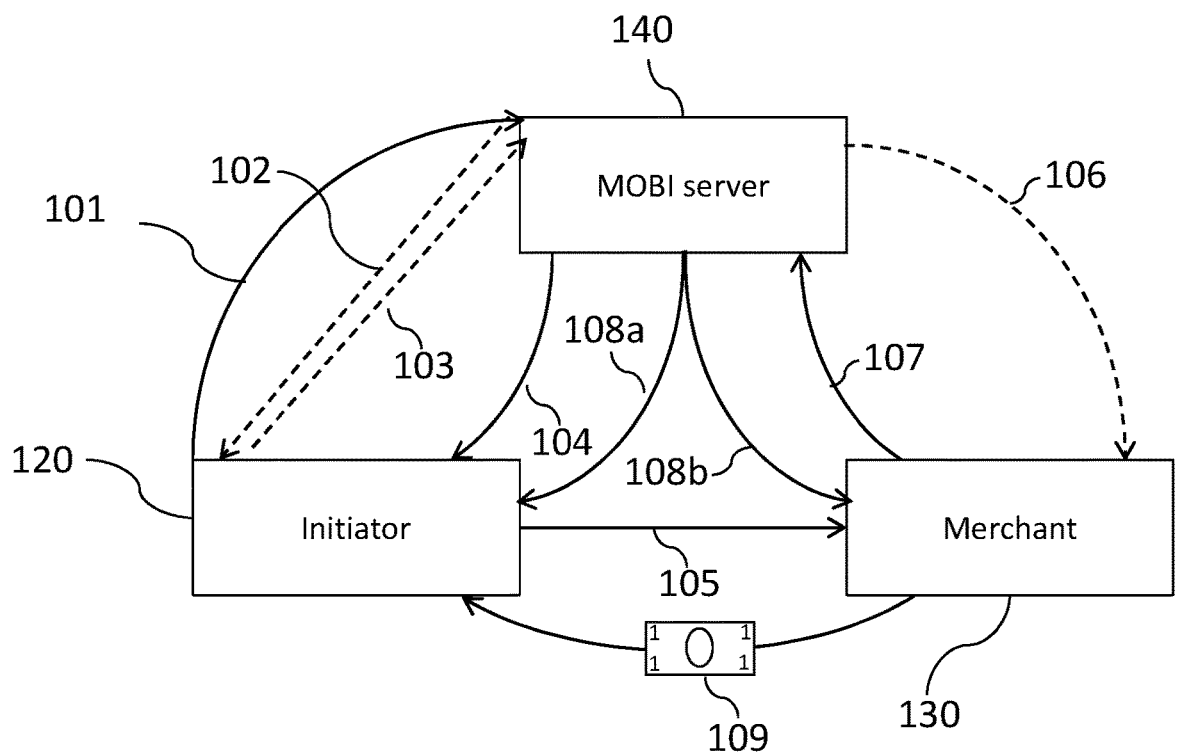
FIG. 8 is a block diagram of a peer-to-peer transaction system in which an initiator can withdraw cash from an account, according to an embodiment of the present invention.

A process to withdraw cash is shown in FIG. 8. A merchant with a cash register 130 takes the role of the recipient. The process proceeds as described above, e.g. as per FIG. 1, with the initiator 120 using the cash withdrawal amount as the transaction amount in the initiation message 101, and the MOBI Central Server 140 optionally verifying the initiator 120 with messages 102 and 103. In this process, a validation code message 104 is sent to the initiator 120 (withdrawal customer), who gives this message 105 to the merchant 130. The merchant 130 may optionally receive a second validation code 106 from the MOBI Central Server 140. The validation process is completed when the merchant 130 sends the validation code(s) 107 to the MOBI Central Server 140. Once the MOBI Central Server sends the confirmation (see 108a and 108b), the merchant 130 gives the cash 109 to the initiator 120.

A settlement process may be performed, on a periodic basis or as needed, to net out debits or credits to the merchant resulting from cash deposits or withdrawals.

As set forth above, MOBIverify provides a multi-step mobile verification system for peer to peer money transfers utilizing cellular phones. In one specific example, MOBIverify may operate in the following manner:

1. Computer code that controls the system to accept receipt of a MOBI P2P standard keyword and recipient phone number via text message.
2. Computer code that controls the system to automatically generate a mobile phone call to the initiator's mobile phone requesting PIN verification.
3. Computer code that controls the system to accept receipt of the initiator's PIN, thus authenticating the initiator's identity.
4. Computer code that controls the system to check initiator's MOBI account for sufficient finds and pre-programmed transaction limits.
5. Computer code that controls the system to check for recipient's MOBI account using recipient's mobile phone number.
6. If an account exists, computer code that controls the system to check for pre-programmed transaction limits.
7. If an account does not exist, computer code that controls the system to generate a MOBI account for the recipient and a temporary PIN. (The recipient may then use the temporary PIN to access and set up their new MOBI account, including choosing another PIN.)
8. Computer code that controls the system to generate a text message to the initiator's 20 mobile phone with a transaction specific verification code (the first verification code) and instructions to forward the first verification code to the recipient.
9. Computer code that controls the system to generate a text message to the recipient's mobile phone alerting recipient of the pending transaction, providing a second transaction specific verification code (the second verification code) and instructions to send a reply text with both verification codes.
10. Computer code that controls the system to accept receipt of recipient's text message containing both the first verification code and the second verification code.
11. Computer code that controls the system to generate a text message to both initiator and recipient to confirm money transfer (and account creation if applicable).
12. Computer code that controls the system to generate an automatic text message if 24 hours elapses without a completed transaction, or if any of the authentication steps is not verified.
13. Computer code that controls the system to adjust authorization levels according to "know your customer" information.

The above description illustrates various embodiments along with examples of how aspects of the present invention may be implemented. For example, direct communication, U.S. mail, phone calls, text messages, data messages or e-mail through wired or wireless voice or data channels, encrypted or not encrypted, and the like may all be considered communication means. A mobile device may be a mobile phone, two-way pager, tablet or notebook computer, and the like. A validation code may be a PIN, or a photograph of one of the transacting parties, or a photograph of identification documents, such as a passport, license, or utility bill, or the like. A verification code may be a PIN, a pseudorandom code, the transaction amount or the like.

The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method for a transaction, comprising:
after receiving, by a server device, a first message for the transaction identifying (i) an account holder, (ii) transaction information and (iii) recipient information, confirming, by the server device, the account holder with a validation check, wherein the validation check comprises:
sending, by the server device to a graphical interface of an account holder device, a second message having a first validation code and instructions to forward the first validation code to a recipient device;
sending, by the server device to the graphical interface of the recipient device, a third message having a second validation code and instructions to send a reply containing the first validation code and the second validation code to the server;
receiving, by the server device from the account holder device, the first validation code;
receiving, by the server, from the recipient device, the first validation code and the second validation code; and
confirming, by the server device, accuracy of the first validation code and the second validation code;
determining, by the server device, a required authorization level for the transaction;
processing, by the server device, a transaction between an account of the account holder and an account of a recipient when (i) the validation check is successful and (ii) the required authorization level is met; and
notifying, by the server device, the account holder via the graphical interface of the account holder device and the recipient via the graphical interface of the recipient device, of the completion of the transaction.

2. The method of claim 1, wherein the first validation code and the second validation code are sent by a text message, a data message, a message via app or a computer-generated phone call.

3. The method of claim 1, wherein the first validation code and the second validation code comprise a personal identification number, a pseudorandom code, a transaction amount, a photograph of a transacting party or a photograph of identification documents.

4. The method of claim 1, wherein the validation check includes comparing transaction information to available balances and preprogrammed transaction limits for the account of the account holder and the recipient account.

5. The method of claim 1, wherein the transaction information and the recipient information is in the form of a text message or a data message.

6. The method of claim 1, wherein the recipient information comprises a mobile number.

7. The method of claim 1, wherein the transaction information includes a transaction amount.

8. The method of claim 1, wherein only the server device, the account holder and the recipient are required to perform a verification function or a validation function.

9. A non-transitory computer-readable medium including instructions executable by a computer for performing a transaction, the instructions causing the computer to:
   after receipt of a first message for the transaction identifying (i) an account holder, (ii) transaction information and (iii) recipient information, confirm the account holder with a validation check, wherein the validation check comprises:
      sending to a graphical interface of an account holder device, a second message having a first validation code and instructions to forward the first validation code to a recipient device;
      sending, to the graphical interface of the recipient device, a third message having a second validation code and instructions to send a reply containing the first validation code and the second validation code to the server;
      receiving from the account holder device, the first validation code;
      receiving from the recipient device, the first validation code and the second validation code; and
      confirming the accuracy of the first validation code and the second validation code;
   determine a required authorization level for the transaction;
   process a transaction between an account of the account holder and an account of a recipient when (i) the validation check is successful and (ii) the required authorization level is met; and
   notify the account holder via the graphical interface of the account holder device and the recipient via the graphical interface of the recipient device, of the completion of the transaction.

10. The non-transitory computer-readable medium of claim 9, wherein the first validation code and the second validation code are sent by a text message, a data message, a message via app or a computer-generated phone call.

11. The non-transitory computer-readable medium of claim 9, wherein the first validation code and the second validation code comprise a personal identification number, a pseudorandom code, a transaction amount, a photograph of a transacting party or a photograph of identification documents.

12. The non-transitory computer-readable medium of claim 9, wherein the validation check includes comparing transaction information to available balances and preprogrammed transaction limits for the account of the account holder and the recipient account.

13. The non-transitory computer-readable medium of claim 9, wherein the transaction information and the recipient information is in the form of a text message or a data message.

14. The non-transitory computer-readable medium of claim 9, wherein the recipient information comprises a mobile number.

15. The non-transitory computer-readable medium of claim 9, wherein the transaction information includes a transaction amount.

* * * * *